US008984958B1

(12) United States Patent
Tucker et al.

(10) Patent No.: US 8,984,958 B1
(45) Date of Patent: Mar. 24, 2015

(54) APPARATUS AND METHOD FOR DETERMINING THE ADHESIVE STRENGTH OF BIOFILMS ON UNDERWATER PROTECTIVE COATINGS

(75) Inventors: Wayne C. Tucker, Exeter, RI (US); Lucie Maranda, Wyoming, RI (US); Edward P. Baker, Exeter, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 373 days.

(21) Appl. No.: 13/564,832

(22) Filed: Aug. 2, 2012

(51) Int. Cl.
*B08B 3/02* (2006.01)

(52) U.S. Cl.
CPC .............. *B08B 3/02* (2013.01); *C02F 2303/20* (2013.01)
USPC .......................................................... 73/842

(58) Field of Classification Search
CPC ................................ B08B 3/02; C02F 2303/20
USPC ............ 73/760, 842; 83/53; 134/22.12, 22.18, 134/155 R
See application file for complete search history.

(56) References Cited

U.S. PATENT DOCUMENTS

| 5,908,349 A | * | 6/1999 | Warehime ..................... 451/102 |
| 2011/0232442 A1 | * | 9/2011 | Guglielmetti et al. ............ 83/53 |

* cited by examiner

*Primary Examiner* — Hezron E Williams
*Assistant Examiner* — David Z Huang
(74) *Attorney, Agent, or Firm* — James M. Kasischke; Jean-Paul A. Nasser; Michael P. Stanley

(57) ABSTRACT

An apparatus and method for determining the adhesive strength of a biofilm formed on an underwater optical surface and for determining the pressure, velocity and configuration of a water jet directed at the biofilm to wash away the biofilm and restore hydrophobicity to the optical surface, with a view to providing removal of such biofilms by underwater travel of a submarine without a need to surface for biofilm removal.

15 Claims, 3 Drawing Sheets

Figure 1:
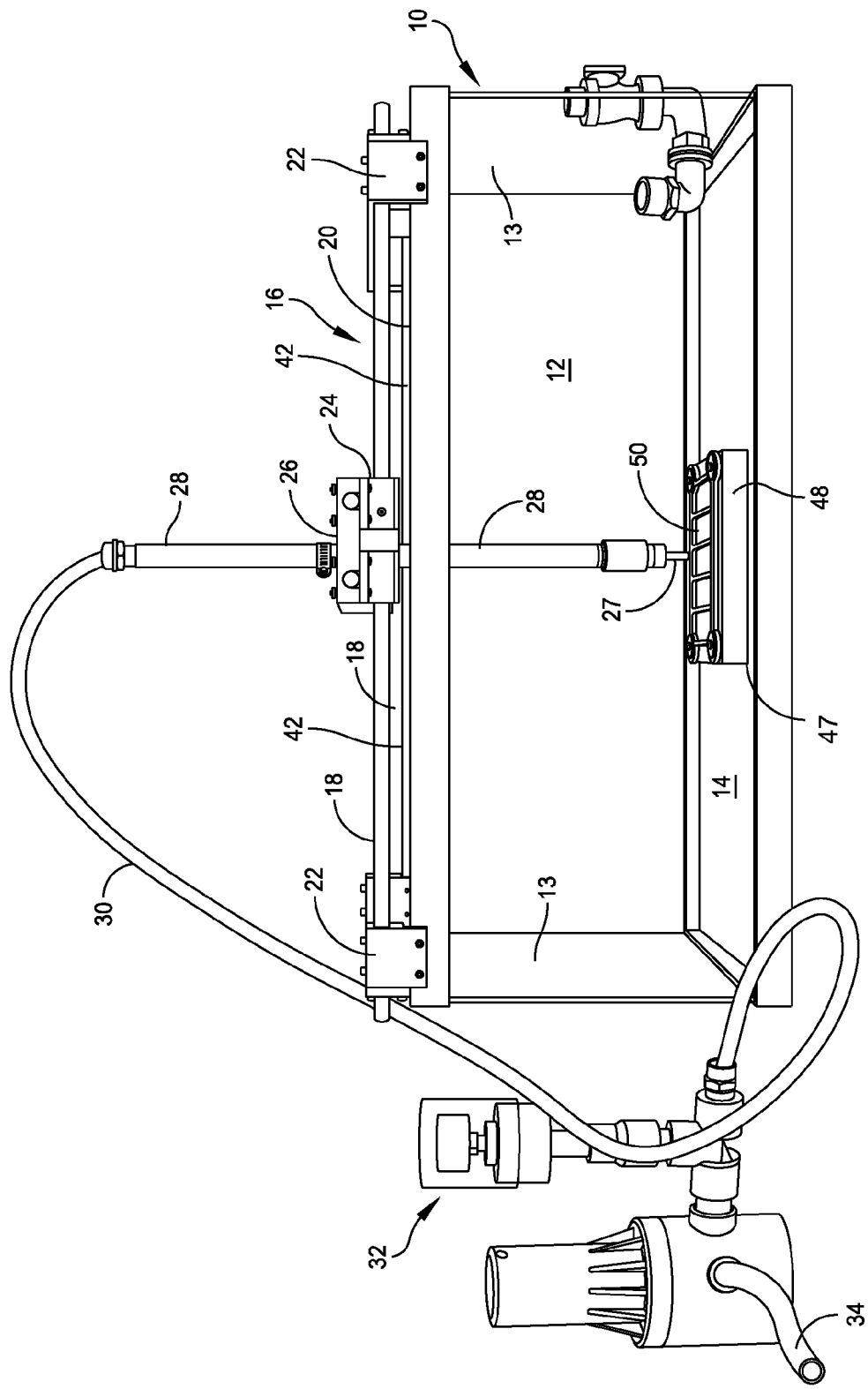
Figure 2:
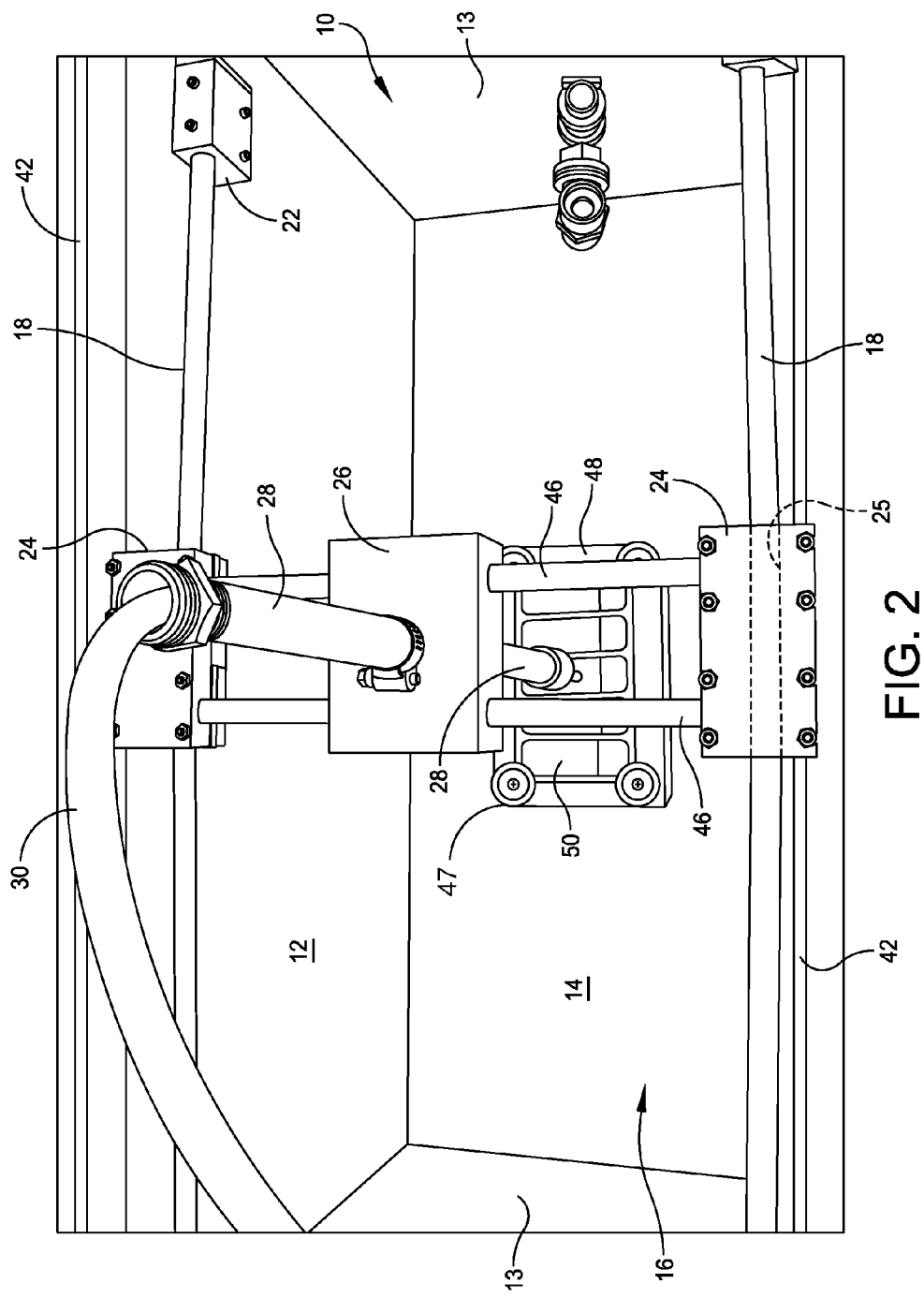
Figure 3:
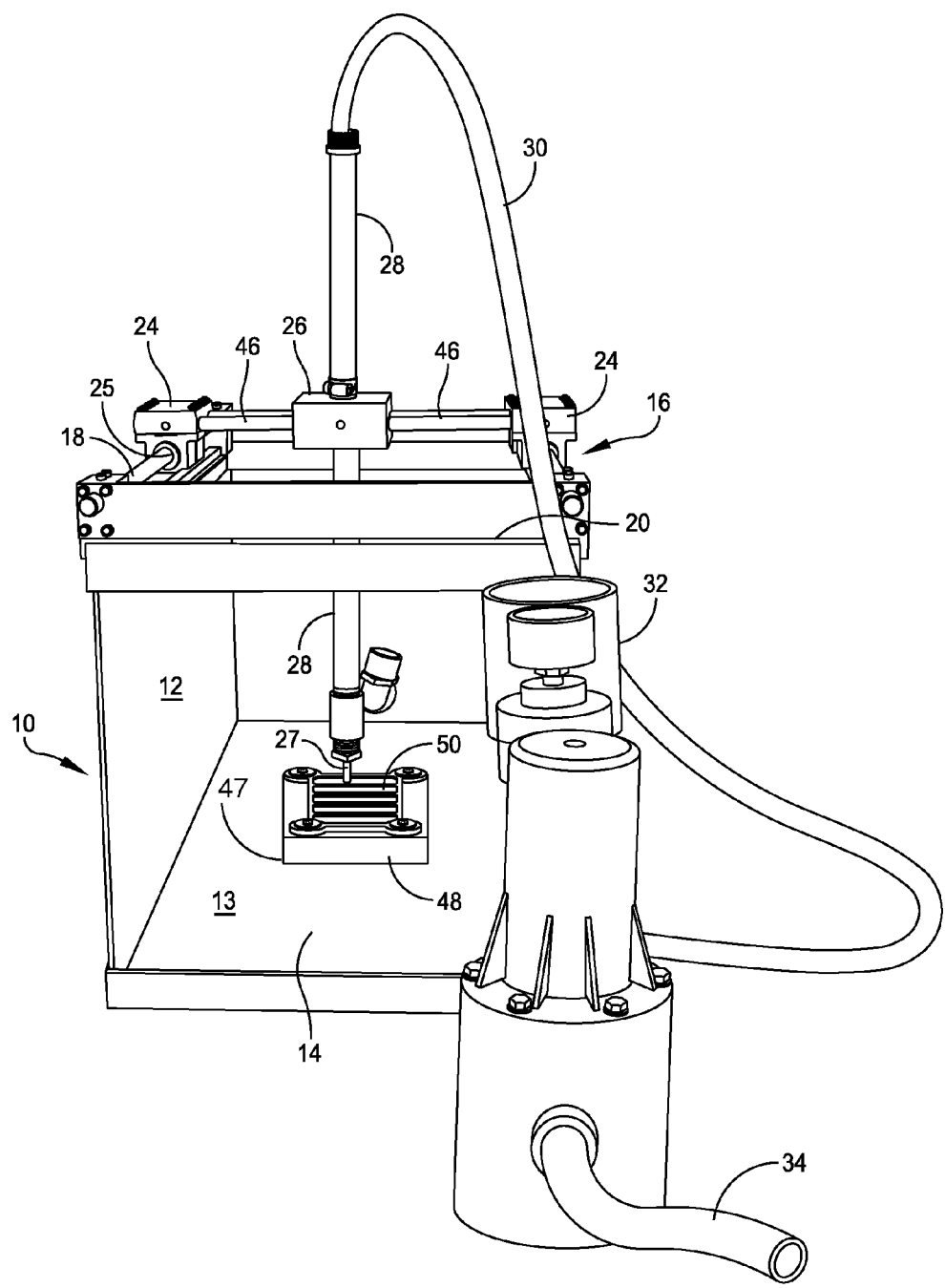

APPARATUS AND METHOD FOR DETERMINING THE ADHESIVE STRENGTH OF BIOFILMS ON UNDERWATER PROTECTIVE COATINGS

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER PATENT APPLICATIONS

None.

BACKGROUND OF THE INVENTION (1) Field of the Invention

The invention relates to the removal of biofilms which form on outer surfaces of underwater optical devices. Despite the use of protective coatings on such optical devices to inhibit the growth of biofilms thereon, in due course biofilms adhere to the optical devices. The invention is directed to determining the adhesive strength of biofilms on protective coatings on such optical devices, and to determining what water pressures and water jet configurations and velocities are required to remove the biofilms and restore clarity to the optical device.

(2) Description of the Prior Art

Biofilm formation on underwater optical devices constitutes an initial step in the process of biofouling. Microorganisms, such as diatoms and bacteria, form colonies on surfaces in seawater. Once a biofilm is established, it serves as a foundation for barnacle larvae, ulna spores ("green sea lettuce"), and other macro-fouling organisms to settle, attach, and grow into macro-fouling colonies.

Long before macro-fouling occurs on optical devices, biofilm formation becomes problematic. Protective coatings are used on optical surfaces of underwater vehicles primarily for their water shedding capabilities upon surfacing. The coatings in current use are generally hydrophobic, meaning they cause water to shed off an optical device similar to rain drops sliding off leaves.

Unfortunately, even with the hydrophobic coatings on optical devices, biofilms tend to form and the coatings lose their hydrophobicity and the affected optical devices lose their optical clarity. In stationary seawater, biofilms can form within two weeks. Attempts to create coatings that are optically clear, hydrophobic and antifouling have thus far proven to be unsuccessful.

Typical methods for maintaining the optical integrity of underwater surfaces include surfacing of the underwater vehicle, wiping the optics with a suitable detergent, followed by a freshwater rinse. However, surfacing the underwater vehicle is not always an available option.

There is thus a need to clear off any accumulated biofilm without surfacing, and while remaining underwater. It has been proposed to use high pressure water jets, to remove biofouling, while the underwater vehicle is submerged and underway. An ideal resolution is to provide such a system as would be operative to prevent biofilms from affecting clarity of optical surfaces and disabling of water-shedding capabilities of the optical surfaces.

Efforts to provide a clear, hydrophobic coating for use in underwater optical systems are ongoing. An important input to such efforts is a thorough knowledge of the adhesive strengths of biofilms on various surfaces. As noted above, studies have centered on the use of high pressure water jets to remove macro-fouling and biofilms.

In order to test the strength of adhesion of biofilms to optical system surfaces and to test various configurations of jet nozzles and water pressures for application to the optical system surfaces, a test facility is required, inasmuch as extensive testing time on operational underwater vehicles is not an option.

There is thus a need for a test system which can be employed in a laboratory or other test facility, for an evaluation of the adhesion of biofilms and particular nozzle configurations and dimensions, and water ejection pressures and velocities, suitable for use on submarines.

SUMMARY OF THE INVENTION

An object of the invention is, therefore, to provide an apparatus and method for determining the adhesive strength of a biofilm formed on an underwater optical surface and the parameters of a water stream adapted to wash away a biofilm. In devising a water jet system for controlling biofilm formation on underwater optical surfaces, and operative while the underwater platforms on which the optical surface is encountered are underway and submerged, it is necessary to determine the adhesive strength of settled microorganisms. It is further necessary to determine suitable configurations, sizes and pressures and velocities of water jets, such that the jets are adapted to sweep away the biofilms.

There is thus provided herein an apparatus and method for determining the adhesion strength of biofilms on optical surfaces, and appropriate nozzle sizes and configurations for water jets, and appropriate water pressure and velocity for each of the nozzles to remove the biofilms.

With the above and other objects in view, as will hereafter appear, a feature of the invention is the provision of a laboratory test assembly which enables the determination of the adhesive strengths of biofilms that have formed on optical surfaces underwater, as in underwater vehicle optical instruments and devices.

With the above and other objects in view, as will hereafter appear, a feature of the present invention is the provision of a test assembly and method by which the adhesive strengths of biofilms may be quantified, such that means and methods to remove such films can be developed, preferably for operations to such film while submerged, as in submarine operation, and/or for operations out of water but at greatly reduced time requirements.

Thus, in accordance with the apparatus and method disclosed herein, the determination of adhesive strengths of biofilms on protective coatings can be determined, leading to the prospect of biofilms being swept away from various surfaces by water jets of predetermined pressures and/or clearing off accumulated biofilm by moving a submerged submarine at a speed determined by use of the present apparatus and method to remove the biofilms while remaining underway.

The apparatus and method described and shown herein seeks to evaluate the adhesive strengths of biofilms and the water jet pressures and configurations and velocities required to sweep away biofilms and restore hydrophobicity to clear surfaces, all without requiring the use of an actual submarine.

The test assembly includes a water tank adapted to receive and retain a selected quantity of water, the tank being of a generally rectangular configuration with substantially transparent side and end walls upstanding from a planar bottom with the upper edges thereof in substantially the same plane. Cylindrically shaped rails, or rods, are fixed proximate upper edges of the side walls of the tank. A slide member is slidably mounted on each of the rails and is movable on the rails. Rails extend widthwise of the tank and interconnect the slide members. A nozzle carriage is slidably mounted on the widthwise rails. A water delivery pipe extends upwardly from the nozzle carriage and is in communication with a water delivery hose, and a water pressure regulator and 0-30 psi gauge is in communication with the water delivery pipe and adapted for connection to a water source. The nozzle carriage is thus adapted to be moved lengthwise of the tank on the rails mounted proximate the side walls of the tank and is adapted to be moved widthwise of the tank on the rails extending widthwise of the tank. A discharge pipe extends from the nozzle carriage and toward the tank bottom, the discharge pipe being in communication with the delivery pipe. A nozzle of a selected size and configuration is disposed on a free end of the discharge pipe. A test slide mount is disposed on the bottom of the tank. Water is flowable through the water delivery hose to the water pressure regulator, wherein the water pressure is limited to a selected range, thence to the water delivery pipe, the nozzle carriage, the discharge pipe, and the nozzle, to direct water at a selected pressure and exit stream configuration toward the test slide mount, whereby to impinge upon a test slide mounted on the test slide mount to determine the extent to which the selected water pressure and velocity and water stream configuration is adapted to remove the biofilm from the protective coating on the test slide.

In accordance with a further feature of the invention, there is provided a method for determining the adhesive strength of biofilms on protective coatings on underwater optical devices and parameters of water flow for removing the biofilms. The method comprises the steps of providing a watertight test tank having parallel side walls, end walls, a bottom wall, a test slide mount disposed on the bottom wall, and a movable nozzle carriage mounted on the side walls and movable lengthwise and widthwise of the tank, the nozzle carriage having a water delivery pipe fixed thereto and in communication with a water source, providing a water pressure regulator in communication with the water source, providing a discharge pipe extending from the nozzle carriage toward the test slide mount, placing a test slide on the test slide mount, the test slide being a test representation of an underwater optical device coated with a biofilm, fixing a selected nozzle of selected size and configuration on a lower-most end of the discharge pipe, and providing for flow of water through the water delivery pipe at a regulated pressure and velocity through the nozzle of selected configuration and size to impinge upon the test slide at the selected angle and pressure and velocity and a stream of selected shape and size, and determining therefrom the adhesive strength of the biofilm and the efficacy of the stream of water directed against the biofilm at the selected configuration and velocity and angle and pressure in removing the biofilm.

Thus, in accordance with the apparatus and method disclosed herein, the determination of the adhesive strength of biofilms on protective coatings can be determined, leading to the prospect of biofilms being swept away from various surfaces by water jets of predetermined pressure and configuration and/or clearing off accumulated biofilm by moving a submerged submarine at a speed determined by use of the present apparatus and method to remove the biofilms while remaining underway.

The apparatus and method described and shown herein serves to evaluate the water jet pressure, velocity and configuration required to sweep away biofilms and restore hydrophobicity to clear surfaces, all without requiring the use of an actual submarine as a test vehicle.

The above and other features of the invention, including various novel details of construction and combinations of parts and method steps, will now be more particularly described with reference to the accompanying drawings and pointed out in the claims. It will be understood that the particular devices and method steps underlying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent, wherein corresponding reference characters indicate corresponding parts throughout the several views of the drawings and wherein:

FIG. 1 is a side elevational view of an assembly for testing adhesion of biofilms and determining water pressures and sizes and configurations of nozzles proficient in removing the biofilms;

FIG. 2 is a top perspective view of a portion thereof; and

FIG. 3 is an end elevational view thereof.

DETAILED DESCRIPTION OF THE INVENTION

Referring to the drawings, it will be seen that the inventive apparatus includes a tank 10 adapted to receive and hold a selected quantity of water. The tank 10 may be of a generally rectangular configuration with side walls 12 and end walls 13, preferably transparent, upstanding from a planar bottom 14. The top 16 of the tank 10 is substantially open. Rails 18 are mounted proximate upper edges 20 of the side walls 12 of the tank 10. The rails 18 preferably are cylindrically-shaped rods. Slide members 24 are slidably mounted on the rails 18. The upper edges of the side walls preferably, are in the same plane.

The slide members 24 support a nozzle carriage 26 which, with the slide members 24, is slidably movable lengthwise of the tank 10 on the rails 18. The slide members 24 are provided with cylindrically shaped bores 25 extending there through and in which are disposed the rails 18, such that the slide members 24 slide along the rails 18. The nozzle carriage 26 supports a water delivery pipe 28 which extends downwardly toward the bottom 14 of the tank 10.

The water delivery pipe 28 also extends upwardly from the nozzle carriage 26 and is connected to a flexible water delivery hose 30 on which there is mounted a water pressure regulator 32 which, in turn, is in communication with a flexible water source hose 34.

The lengthwise rails 18 are mounted on lengthwise upper edges 42 of the side walls 12 of the tank 10. The slide members 24 are mounted respectively proximate the upper edges 42 of the tank side walls 12 and are movable along the rails 18. The nozzle carriage 26 is slidably mounted on rails 46 which extend widthwise between the slide members 24. Thus, the nozzle carriage 26 is movable on rails 18, 46 lengthwise and widthwise of the tank 10. On the bottom 14 of the tank 10, there is disposed a test slide mount assembly 48 for receiving and retaining a test slide 50 which may be mounted for testing of the adhesive strengths of the biofilms on the slide and/or for the determination of water pressures and nozzle configurations and sizes most adapted to remove the biofilm from the slide. The test slide mount assembly 48 includes a special fitting designed to hold a pressure sensor transducer 47 through the bottom of tank 10 in order to calibrate the nozzle pressure at nozzle 27. This allows pressure measurements to be taken with the sensor in the water without exposing the electronics of the transducer 47 to seawater. In one embodiment, the test slide mount 48 may be provided with a hermaphroditic connecting surface adapted to receive and hold a complementary hermaphroditic connecting surface of a test slide 50.

In accordance with the inventive method for determining the adhesive strength of biofilms on protective coatings on underwater optical devices, there is provided the watertight test tank 10 having the parallel side walls 12, end walls 13, the bottom wall 14, test slide mount 48 disposed on the bottom wall 14, and the movable nozzle carriage 26 mounted between the side walls 12 and movable lengthwise and widthwise of the tank 10.

The nozzle carriage 26 is provided with the water delivery pipe 28 fixed thereto and in communication with a water source. The water pressure regulator 32 is provided in communication with the water source, and the discharge pipe 28 extends from the nozzle carriage 26 toward the test slide mount 48 and is provided with a nozzle 27 of selected size and configuration at a lower end thereof.

The method includes the further steps of placing the test slide 50 on the test slide mount 48, the test slide being a test portion or replica of an underwater optical device coated with a biofilm, fixing a selected nozzle 27 of selected size and configuration on a lower-most end of the discharge pipe 28, and providing for flow of water, through the discharge pipe 28 at a regulated pressure, and through the nozzle 27 of selected configuration and size, to impinge upon the test slide 50 at the selected angle and pressure and velocity and stream of selected shape and size, and determining therefrom adherence of the biofilm to the test slide and the efficiency of a stream of water directed against the biofilm at a selected configuration and angle and pressure and velocity in removing the biofilm.

The method further includes the steps of operating the water pressure regulator to effect changes in the pressure and velocity of the water discharged by the nozzle. The method still further includes the steps of effecting a series of different water pressures and different nozzle configurations and sizes to obtain an indication of the most beneficial water pressure, velocity, nozzle size and configuration for removing biofilm from the surface of an optical device.

The foregoing describes the invention in terms of embodiments foreseen by the inventors and for which an enabling description is available. Insubstantial modifications of the invention not presently foreseen may nonetheless represent equivalents. It will be understood that many additional changes in the details, steps and arrangement of parts, which have been herein described and illustrated in order to explain the nature of the invention, may be made by those skilled in the art within the principles and scope of the invention as expressed in the appended claims.

What is claimed is:

1. Apparatus for determining the adhesive strength of biofilms on protective coatings on underwater optical devices, and for determining water jet pressures and water jet speeds and configurations required to remove the biofilms and restore clarity to the optical devices, the apparatus comprising:

a tank adapted to receive and retain a selected quantity of water, said tank being of a rectangular configuration with side and end walls upstanding from a planar bottom;

rails mounted proximate upper edges of the side walls of said tank;

a slide member slidably mounted on each of said rails and movable on said rails;

rails extending widthwise of said tank and interconnecting said slide members;

a nozzle carriage slidably disposed on said widthwise extending rails;

a water delivery pipe extending upwardly from said nozzle carriage and in communication with a water delivery conduit;

a water pressure regulator in communication with said water delivery conduit and adapted for connection to a water source;

whereby said nozzle carriage is adapted to be moved lengthwise of said tank on said rails mounted proximate the side walls of said tank and is adapted to be moved widthwise of said tank on said rails extending widthwise of said tank;

a discharge pipe extending from said nozzle carriage and toward said tank bottom, said discharge pipe being in communication with said delivery pipe;

a nozzle of a selected size and configuration disposed on an end of said discharge pipe; and a test slide mount assembly disposed on the bottom of said tank whereby water is flowable through said water delivery conduit to said water pressure regulator; wherein a pressure sensor transducer is housed within said test slide mount assembly in order to calibrate a nozzle pressure, wherein the water pressure is limited to a selected range, thence to said water delivery pipe, said nozzle carriage, said discharge pipe, and said nozzle, to direct water at a selected pressure and exit stream configuration and velocity toward said test slide mount, whereby to impinge upon a test slide mounted on said test slide mount, said test slide being a replica of a surface of an underwater optical device having a protective coating and also covered by a biofilm, to determine the adhesive strength of the biofilm and the extent to which the selected water pressure and water stream configuration are adapted to remove the biofilm from the protective coating on the test slide.

2. The apparatus in accordance with claim 1 wherein each of said side wall rails is disposed in a bore of one of said slide members, such that each slide member is slidably movable on one of said rails lengthwise of said tank.

3. The apparatus in accordance with claim 2 and further comprising at least two of said widthwise extending rails fixed at each end thereof to one of said slide members.

4. The apparatus in accordance with claim 3 wherein said nozzle carriage is adapted to be disposed at a selected position on said widthwise extending rails and said slide members are adapted to be disposed at selected locations on said rails mounted on said side walls of said tank.

5. The apparatus in accordance with claim 4 wherein said nozzle carriage is movable to place said nozzle at selected positions over said test slide disposed on said test slide mount.

6. The apparatus in accordance with claim 5 wherein said nozzle comprises a nozzle selected from a group of nozzles of different configurations and sizes.

7. The apparatus in accordance with claim 2 wherein said slide members each comprise a block having a smooth bore extending there through parallel to the upper edge of the side wall.

8. The apparatus in accordance with claim 1 wherein the side and end walls of said tank are substantially transparent.

9. The apparatus in accordance with claim 1 wherein the upper edges of the side walls are disposed in a same plane.

10. The apparatus in accordance with claim 1 within said rails mounted proximate the upper edge of the side walls comprise cylindrically shaped rods fixed at both ends thereof to the upper edges of the side walls.

11. The apparatus in accordance with claim 1 wherein said test slide mount is provided with a hermaphroditic connecting surface adapted to receive and retain a test slide having a complementary hermaphroditic connecting surface.

12. A method for determining sufficient water pressure and water stream configuration to remove biofilms on protective coatings on underwater optical devices, the method comprising the steps of:

providing a watertight test tank having parallel side walls, end walls, a bottom wall, a test slide mount disposed on the bottom wall, and a movable nozzle carriage mounted on the side walls and movable lengthwise and widthwise of the tank;

joining a water delivery pipe to the nozzle carriage, wherein said water delivery pipe is fixed thereto and in communication with a water source;

providing a discharge pipe extending from the nozzle carriage toward the test slide mount; and directing a stream of water from the discharge pipe, through a nozzle of selected size and configuration, and at a selected pressure and velocity onto a test slide mounted on said test slide mount, said test slide being a replica of a surface of an underwater optical device having a protective coating and also covered by a biofilm, wherein said stream of water impinges on the biofilm to determine the parameters of water pressure and configuration of the stream of water most suited for removal of the biofilm.

13. The method in accordance with claim 12 wherein the slide mount comprises a hermaphroditic connecting surface and the test slide comprises a hermaphroditic connecting surface, the surfaces being adapted for interconnection to attach the test slide to the slide mount and separable by lifting the test slide from the slide mount.

14. The method in accordance with claim 12 and comprising the further step of operating the water pressure regulator to effect changes in the pressure of the water discharged by the nozzle.

15. The method in accordance with claim 14 and comprising the further steps of effecting a series of different water pressures, and different nozzle configurations and sizes, to obtain an indication of the most beneficial water pressure, nozzle size, and nozzle configuration for removing the biofilm from the surface of the optical device being tested, which can also be used to determine a speed and depth at which a submarine could proceed underwater to accomplish wash-away of the biofilm.

* * * * *